(12) United States Patent
Ogheard et al.

(10) Patent No.: US 12,510,678 B2
(45) Date of Patent: Dec. 30, 2025

(54) DEVICE COMPRISING A CAPILLARY TUBE AND A MEASUREMENT MODULE FOR ESTIMATING AN ACTIVITY OF A RADIOACTIVE LIQUID

(71) Applicants: Commissariat à l'Energie Atomique et aux Energies Alternatives, Paris (FR); Florestan Ogheard, Lyons (FR)

(72) Inventors: Florestan Ogheard, Lyons (FR); Benoit Sabot, Gif-sur-Yvette (FR); Philippe Gervais, Orsay (FR); Matthieu Hamel, Gif-sur-Yvette (FR)

(73) Assignees: Florestan Ogheard, Lyons (FR); Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 18/862,372

(22) PCT Filed: Apr. 28, 2023

(86) PCT No.: PCT/EP2023/061206
§ 371 (c)(1),
(2) Date: Nov. 1, 2024

(87) PCT Pub. No.: WO2023/213697
PCT Pub. Date: Nov. 9, 2023

(65) Prior Publication Data
US 2025/0258305 A1 Aug. 14, 2025

(30) Foreign Application Priority Data
May 1, 2022 (FR) ..................... 2204120

(51) Int. Cl.
*G01T 1/167* (2006.01)
*G01T 1/164* (2006.01)
(Continued)

(52) U.S. Cl.
CPC ............ *G01T 1/167* (2013.01); *G01T 1/1645* (2013.01); *G01T 1/2006* (2013.01); *G01T 1/2026* (2013.01); *G01T 1/248* (2013.01)

(58) Field of Classification Search
CPC ........... G01T 1/16; G01T 1/161; G01T 1/164; G01T 1/1641; G01T 1/1642;
(Continued)

(56) References Cited

U.S. PATENT DOCUMENTS

| | | | |
|---|---|---|---|
| 3,657,541 A | | 4/1972 | Deutsch et al. |
| 3,726,599 A | * | 4/1973 | Neary .................... G01N 21/03 |
| | | | 250/361 C |

(Continued)

FOREIGN PATENT DOCUMENTS

| | | |
|---|---|---|
| WO | WO 99/67656 A1 | 12/1999 |
| WO | WO2023/213697 A1 * | 11/2023 ............. G01T 1/167 |

OTHER PUBLICATIONS

International Search Report & Written Opinion issued Jul. 3, 2023 in PCT/EP2023/061206, filed on Apr. 28, 2023, 11 pages.
(Continued)

*Primary Examiner* — Allen C. Ho
(74) *Attorney, Agent, or Firm* — Oblon, McClelland, Maier & Neustadt, L.L.P.

(57) ABSTRACT

A device to measure the activity of a radioactive liquid, including a detection module, which extends around a measurement chamber that is intended to contain the liquid, and which is configured to detect ionizing radiation and to generate a detection signal; and a processing unit, which is connected to the detection module, and programmed to estimate an activity of the radioactive liquid based on the detection signal. The detection module comprises a solid-state scintillator detector, extending around the measurement chamber; and at least two photodetectors that are
(Continued)

optically coupled to the scintillator detector. The device comprises a capillary tube, extending around a longitudinal axis, the capillary tube being arranged to be placed in a measurement position, and the capillary tube forming the measurement chamber.

23 Claims, 11 Drawing Sheets

(51) Int. Cl.
    *G01T 1/20*       (2006.01)
    *G01T 1/202*     (2006.01)
    *G01T 1/24*       (2006.01)

(58) Field of Classification Search
    CPC ......... G01T 1/1645; G01T 1/167; G01T 1/20; G01T 1/2006; G01T 1/2018; G01T 1/20182; G01T 1/20185; G01T 1/20187; G01T 1/20188; G01T 1/202; G01T 1/2026; G01T 1/248; G01T 1/29; G01T 1/2907; G01T 1/2914; G01T 1/2921; G01T 1/2928
    USPC ............ 250/361 R, 370.06, 370.11, 363.01, 250/363.02, 363.03, 363.04, 363.05, 250/363.08, 363.09, 363.1, 364, 370.09; 378/65, 98.8, 207
See application file for complete search history.

(56) References Cited

U.S. PATENT DOCUMENTS

| | | | | | |
|---|---|---|---|---|---|
| 3,898,463 | A | * | 8/1975 | Noakes | G01T 1/204 250/369 |
| 3,944,832 | A | * | 3/1976 | Kalish | G01T 1/202 250/361 R |
| 4,651,006 | A | * | 3/1987 | Valenta | G01T 1/204 250/363.01 |
| 4,920,270 | A | * | 4/1990 | Grodzins | G01T 1/178 250/DIG. 2 |
| 5,483,070 | A | * | 1/1996 | Valenta | G01T 1/204 250/362 |
| 5,665,971 | A | * | 9/1997 | Chen | G01T 1/2907 250/361 R |
| 5,866,907 | A | * | 2/1999 | Drukier | G01T 1/208 250/366 |
| 6,255,657 | B1 | * | 7/2001 | Cole | G01T 3/06 250/370.06 |
| 8,039,810 | B2 | * | 10/2011 | Rodgers | G01T 1/2008 250/370.11 |
| 8,198,599 | B2 | * | 6/2012 | Bouton | G01T 7/02 250/393 |
| 9,383,456 | B2 | * | 7/2016 | Clarke | G01T 7/02 |
| 9,417,332 | B2 | * | 8/2016 | Bouton | G01T 1/241 |
| 9,715,020 | B2 | * | 7/2017 | Mabie | G01T 1/167 |
| 9,958,563 | B2 | * | 5/2018 | Furuta | G01T 7/08 |
| 10,191,160 | B1 | * | 1/2019 | Newman | G01T 1/20 |
| 10,274,609 | B2 | * | 4/2019 | Robinson | G01T 1/003 |
| 10,416,318 | B1 | * | 9/2019 | Newman | G01T 1/204 |
| 10,551,514 | B1 | * | 2/2020 | Newman | G01T 1/2002 |
| 10,751,432 | B2 | * | 8/2020 | Schimmoeller | G01T 1/20 |
| 11,029,418 | B2 | * | 6/2021 | Adler | G01T 1/167 |
| 11,092,700 | B2 | * | 8/2021 | Kato | G01T 1/167 |
| 12,170,153 | B2 | * | 12/2024 | Nunn | A61B 50/13 |
| 2020/0241153 | A1 | | 7/2020 | Kato et al. | |

OTHER PUBLICATIONS

Broda et al., "Radionuclide metrology using liquid scintillation counting", Metrologia 44, Aug. 2007, 18 pages.

* cited by examiner

DEVICE COMPRISING A CAPILLARY TUBE AND A MEASUREMENT MODULE FOR ESTIMATING AN ACTIVITY OF A RADIOACTIVE LIQUID

TECHNICAL FIELD

The technical field of the invention is analysis of the activity per unit volume or mass of a radioactive liquid, notably with a view to use for the purposes of diagnostics or medical treatment.

PRIOR ART

Certain applications in nuclear medicine require a product labeled with a radioactive isotope to be introduced into the body. The term "radiopharmaceutical" is also employed. The product may be intended for the purposes of medical treatment, for example in the context of a brachytherapy treatment. The product may also be intended for the purposes of diagnostics.

Among the radioactive isotopes, or radionuclides, usually used in nuclear medicine, mention may for example be made of $^{11}C$, $^{18}F$, $^{67}Ga$, $^{90}Y$, $^{99m}Tc$, $^{111}In$, $^{123}I$, $^{125}I$, $^{131}I$, and $^{201}Tl$. Prior to their injection into the body of a patient, it is necessary to quantify their activity as accurately as possible. It may also be useful to identify and quantify the presence of any impurities resulting from the process used to produce the radioactive isotopes.

In a hospital environment, the activity of an isotope is quantified prior to its injection, using a measurement device usually referred to as an activity meter. An activity meter is a detector, generally an ionization chamber, forming a well. The radioactive product is introduced, in liquid form, into the well and its activity is estimated. The radioactive product is contained in a container, such as a syringe or a vial. The ionization chamber is calibrated beforehand, so as to allow a relationship to be obtained between an amplitude of the current resulting from the ionization chamber, and the activity of the radioactive isotope. The calibration depends on the type of isotope used. The calibration also depends on the geometry of the measurement, i.e. on the shape and nature of the container holding the radioactive product. The calibration for example differs depending on whether the radioactive product is contained in a syringe or a vial. The calibration depends on the fill level and on the isotope to be measured. The calibration generally requires a specialized laboratory.

The document U.S. Pat. No. 3,657,541 describes a device allowing an activity of a radioactive liquid intended for medical use to be determined.

The inventors have provided a device allowing the activity per unit volume, or mass, of a solution containing an isotope intended to be used in nuclear medicine to be estimated, in a simple and automatable manner, without a complex calibration being required.

SUMMARY OF THE INVENTION

A first subject of the invention is a device intended to measure the activity of a radioactive liquid, and notably of a droplet of radioactive liquid, comprising:
  a detection module, which extends around a measurement chamber that is intended to contain the liquid, the detection module being configured to detect ionizing radiation emitted in the measurement chamber and to generate a detection signal dependent on an amount of radiation detected;
  a processing unit, which is connected to the detection module, and programmed to estimate an activity of the radioactive liquid based on the detection signal;
the device being characterized in that
  the detection module comprises:
    a solid-state scintillator detector configured to produce scintillation photons when it is exposed to ionizing radiation, the scintillator detector extending around the measurement chamber;
    at least two photodetectors that are optically coupled to the scintillator detector, each photodetector being configured to detect scintillation photons and to generate a detection signal dependent on the amount of scintillation photons detected;
  the device comprising a capillary tube, which extends around a longitudinal axis, and which defines an internal space intended to contain the radioactive liquid, the capillary tube being arranged to be placed in a measurement position in which the scintillator detector extends around the internal space of the capillary tube, the capillary tube forming the measurement chamber.

Preferably, the scintillator detector extends around the capillary tube.

According to one possibility, the scintillator detector forms a wall of the capillary tube.

Advantageously,
  an aperture is produced through the scintillator detector, along the longitudinal axis;
  the capillary tube extends through the aperture when it is placed in the measurement position.

Each photodetector may notably extend around a detection axis secant to the longitudinal axis. The respective detection axes of each photodetector are preferably coplanar, and preferably in a plane perpendicular to the longitudinal axis. The respective detection axes of each photodetector are preferably regularly spaced angularly with respect to one another about the longitudinal axis.

The scintillator detector may comprise a spherical or cylindrical or polyhedral central segment, through which the aperture passes. The device is such that the capillary tube is inserted into the aperture at least in the measurement position.

Each photodetector is preferably optically coupled to the scintillator detector by a planar face. The planar face is intended to promote optical coupling with the photodetector.

According to one possibility, the scintillator detector extends, from the aperture, to at least one planar face, so that the scintillator detector comprises the central segment, around the aperture, and the planar face.

Preferably, the scintillator detector comprises as many planar faces as there are photodetectors.

According to one possibility, the device comprises a material that is transparent to the scintillation photons, extending between the scintillator detector and at least one planar face.

The device may comprise a spectrometric detector which lies facing the capillary tube, and which is connected to the processing unit. The spectrometric detector is connected to the processing unit, the processing unit being configured to detect the presence of impurities, notably metal impurities, in the liquid, based on X-ray fluorescence peaks detected in a spectrum generated by the spectrometric detector.

Preferably, the device comprises a motorized translating unit configured to move the capillary tube translationally along the longitudinal axis, so that the capillary tube may pass between the measurement position, facing the scintillator detector, and at least one sampling position, the sampling position being offset, along the longitudinal axis, with respect to the measurement position.

The device may comprise a pumping unit, configured to:
admit, in the sampling position, liquid into the internal space of the capillary tube when the capillary tube is in contact with a solution contained in a reservoir, the liquid contained in the capillary tube forming a sample of said solution;
and/or expel liquid from the internal space of the capillary tube.

According to one possibility, the capillary tube has an internal face bounding the internal space, the internal face being hydrophobic.

According to one preferred embodiment,
the detection signal resulting from each photodetector comprises pulses, each pulse resulting from an interaction of one particle, forming the ionizing radiation, in the scintillator detector;
the processing unit comprises a coincidence detection circuit, configured to detect pulses detected in temporal coincidence by at least two photodetectors;
the processing unit is programmed to estimate activity depending on a number of pulses detected in temporal coincidence.

Preferably, the device comprises at least three photodetectors. The coincidence detection circuit is programmed to allow detection of pulses detected in temporal coincidence by two detectors, these being called double coincidences, and detection of pulses detected in temporal coincidence by three detectors, these being called triple coincidences. The processing unit may be programmed to estimate activity depending on a number of double coincidences detected per unit time. The activity may be estimated based on a detection efficiency, obtained by comparing a number of double coincidences to a number of triple coincidences detected during a given measurement period.

The device may comprise an observation camera arranged to view the capillary tube when the capillary tube is in an observation position, the observation position being offset from the measurement position, the processing unit being programmed to estimate a volume of liquid in the capillary tube depending on an image delivered by the observation camera.

A second subject of the invention is a method for estimating an activity of a liquid using a device according to the first subject of the invention, comprising the following steps
a) introducing a liquid sample into the capillary tube;
b) placing the capillary tube in the measurement position;
c) acquiring detection signals with each photodetector;
d) depending on the acquired detection signals, estimating the activity of the liquid sample present in the capillary tube, using the processing unit.

According to one possibility,
in step a), the capillary tube occupies a sampling position, in contact with a reservoir containing the liquid;
between step a) and step b), the capillary tube is moved, by the translating unit, from the sampling position to the measurement position.

According to one possibility,
the device comprises a pumping unit, as described above;
in step a), the pumping unit is activated so as to suck some of the liquid present in the reservoir toward the capillary tube.

Step d) may comprise:
detecting, in the detection signals, pulses generated in temporal coincidence by two photodetectors, these being called double coincidences;
taking into account a detection efficiency relating to double coincidences;
determining the activity based on a number of double coincidences detected per unit time and the detection efficiency relating to double coincidences.

According to one possibility,
the device comprises three photodetectors;
the detection efficiency relating to double coincidences is calculated based on a ratio between
a number of pulses generated, in the detection signals, in temporal coincidence by three photodetectors, these being called triple coincidences; and
the number of double coincidences.

Another subject of the invention is a scintillator detector, through which a cylindrical aperture passes, the cylindrical aperture extending along a central axis, the scintillator detector comprising:
a central segment, which is formed of a solid material that is configured to generate scintillation photons under the effect of exposure to ionizing radiation, the central segment extending around the aperture;
planar faces, which are optically coupled to the central segment, each planar face being configured to be coupled to one photodetector.

According to one possibility, the central segment is spherical and extends around the cylindrical aperture. According to another possibility, the central segment is cylindrical, and extends around the aperture, around an axis coaxial with the central axis. According to another possibility, the central segment is polyhedral, cubic for example.

Preferably, the central segment has rotational symmetry about the central axis.

Preferably, the central segment extends, from the central axis, to a radius greater than 5 mm or 10 mm.

The invention will be better understood on reading the description of the examples of embodiment that are described, in the remainder of the description, with reference to the figures listed below.

FIGURES

In FIGS. 1A, 1B and 1C, a capillary tube of the device is placed in a sampling position, in an observation position and in a measurement position, respectively.

Figure 2A:
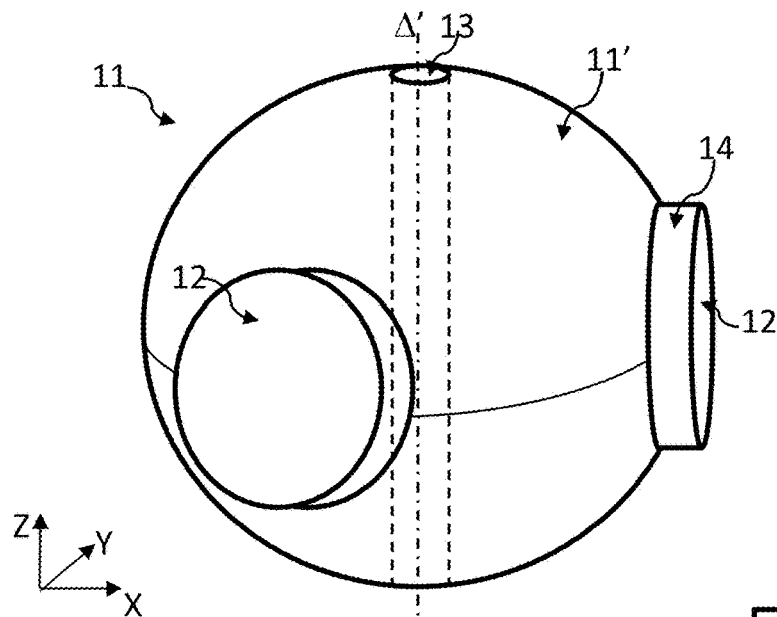
FIG. 2A shows one example of a scintillator detector.
Figure 2B:
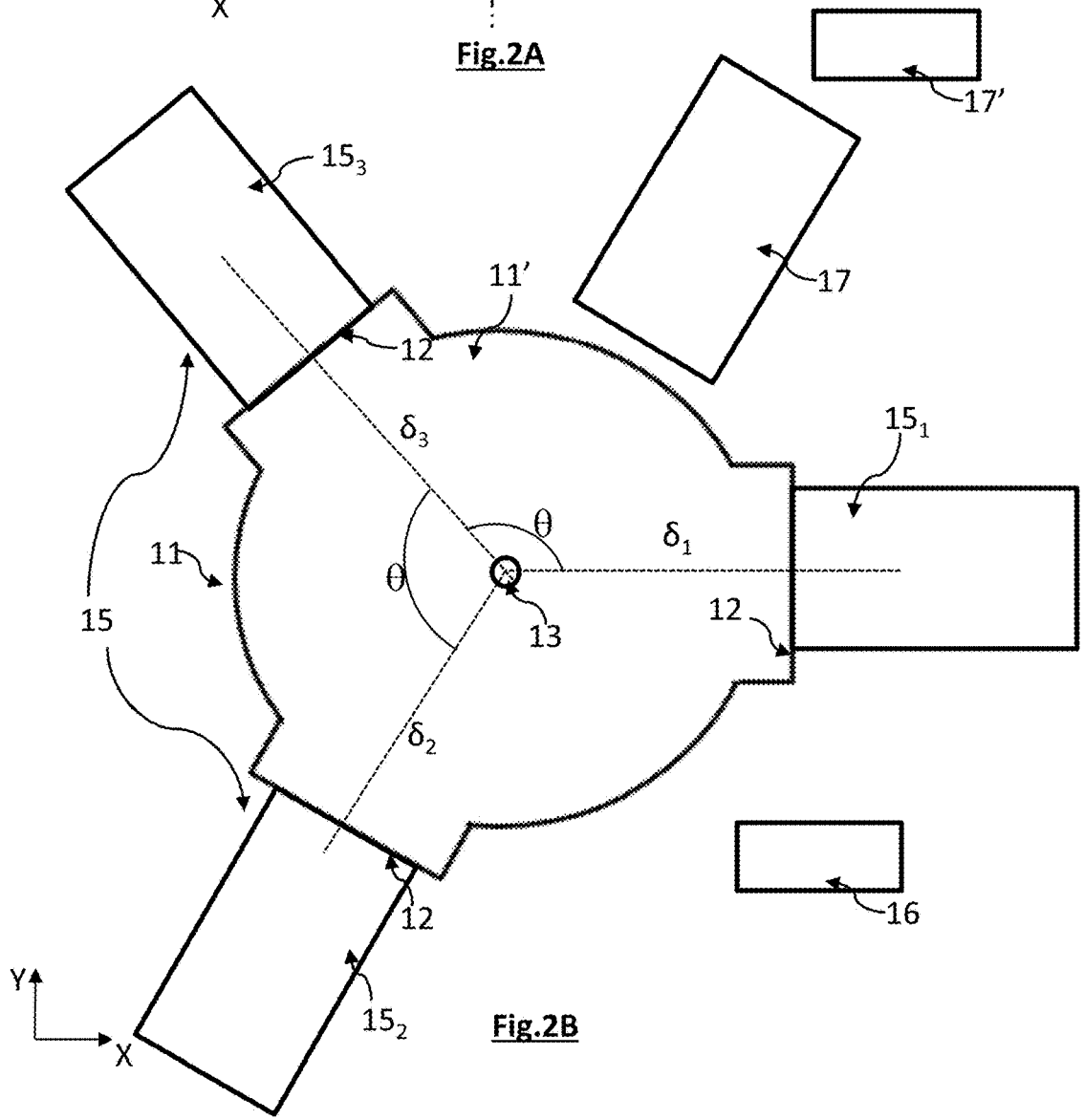
FIG. 2B shows the scintillator detector, described with reference to FIG. 2A, coupled to three photomultipliers.
Figure 2C:
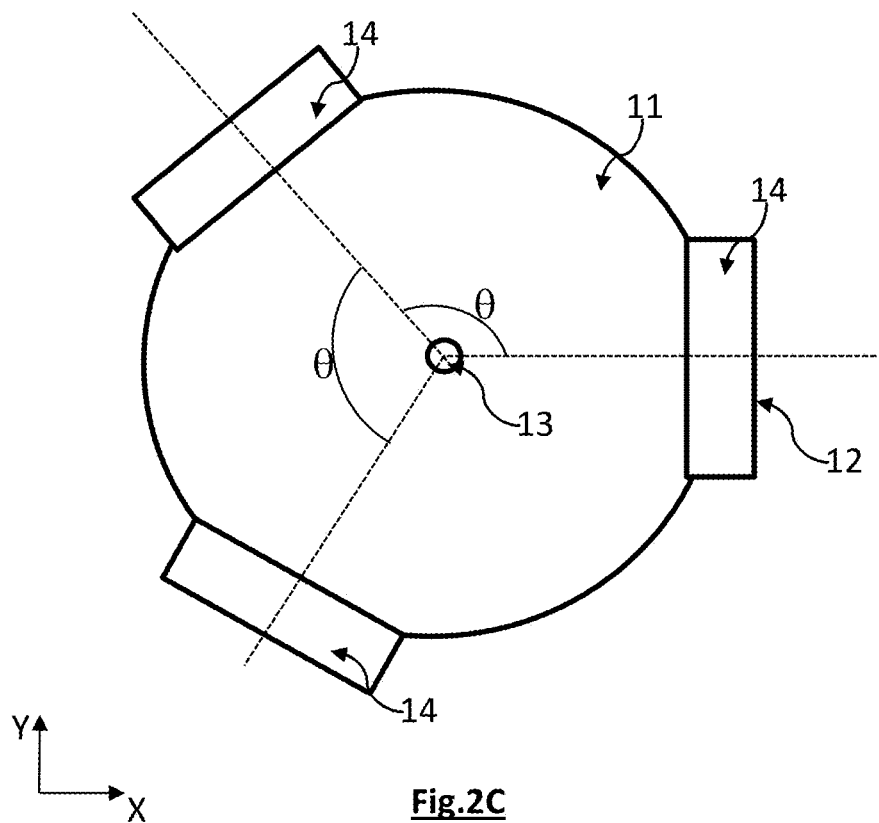
FIG. 2C shows another example of a scintillator detector.
Figure 2D:
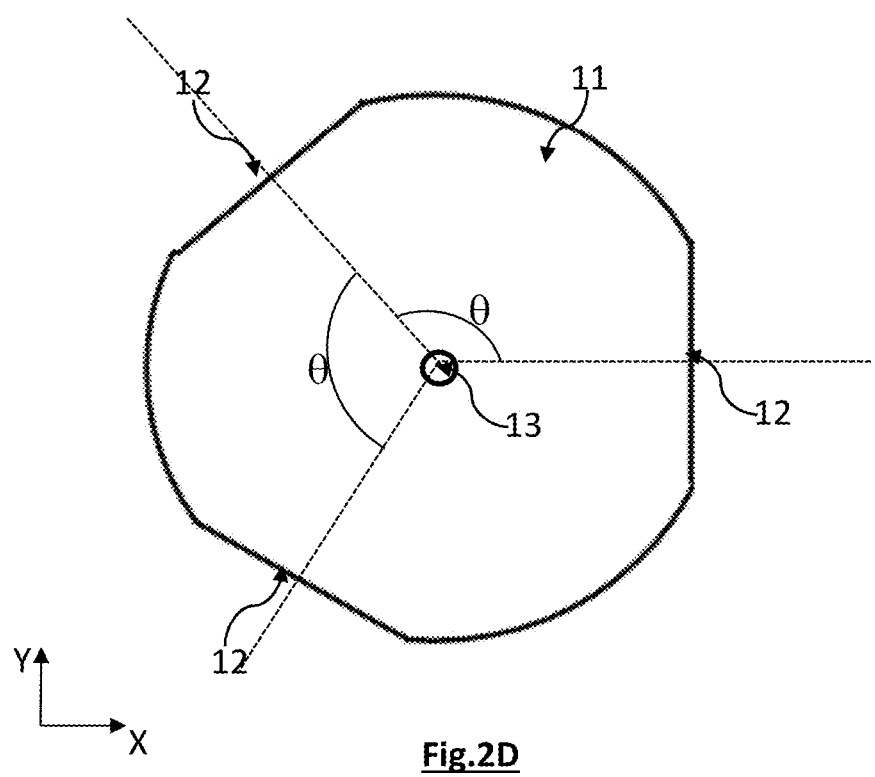

FIG. 2D schematically shows another example of a scintillator detector.

Figure 3A:
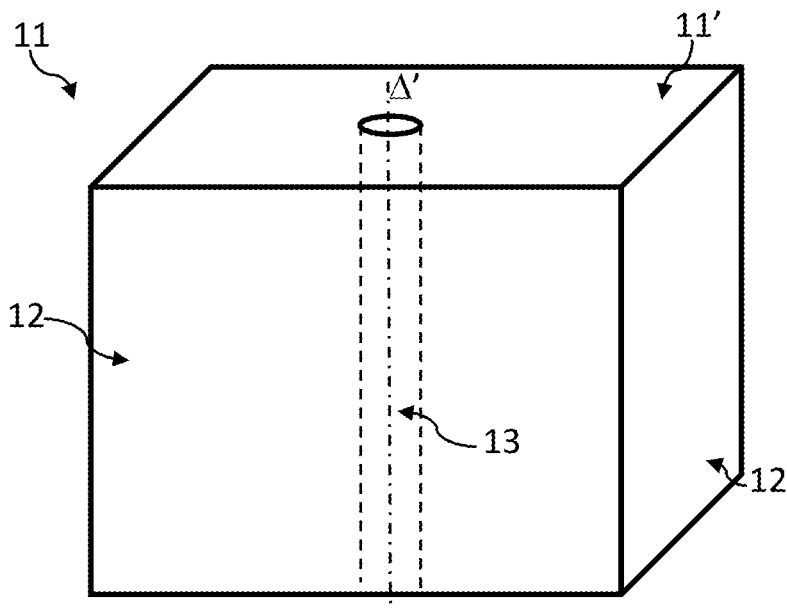
Figure 3B:
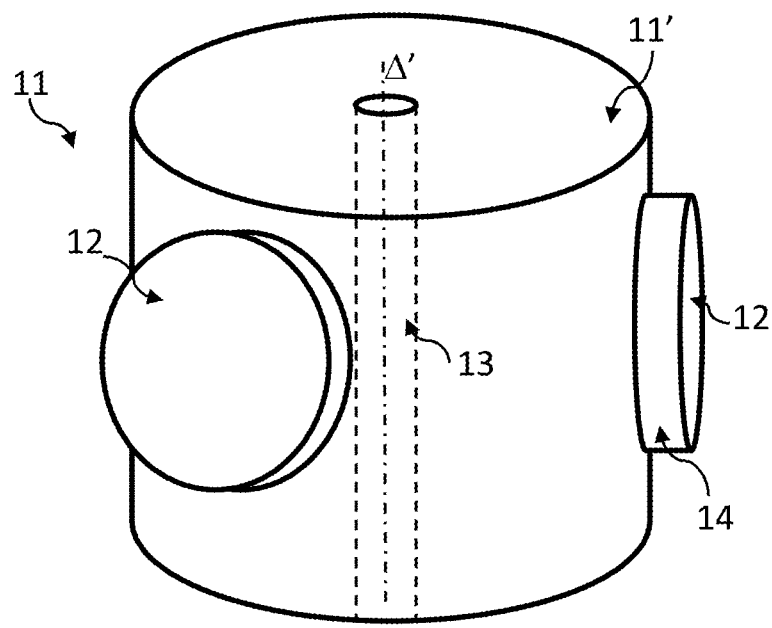

FIGS. 3A and 3B show other possible configurations of the scintillator detector.

Figure 4A:
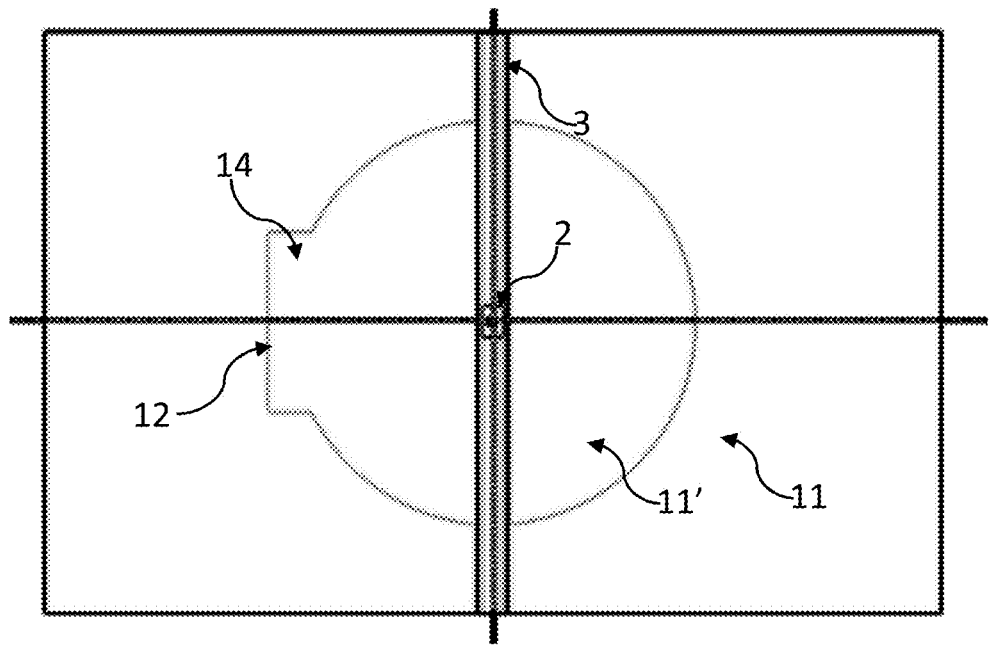
Figure 4B:
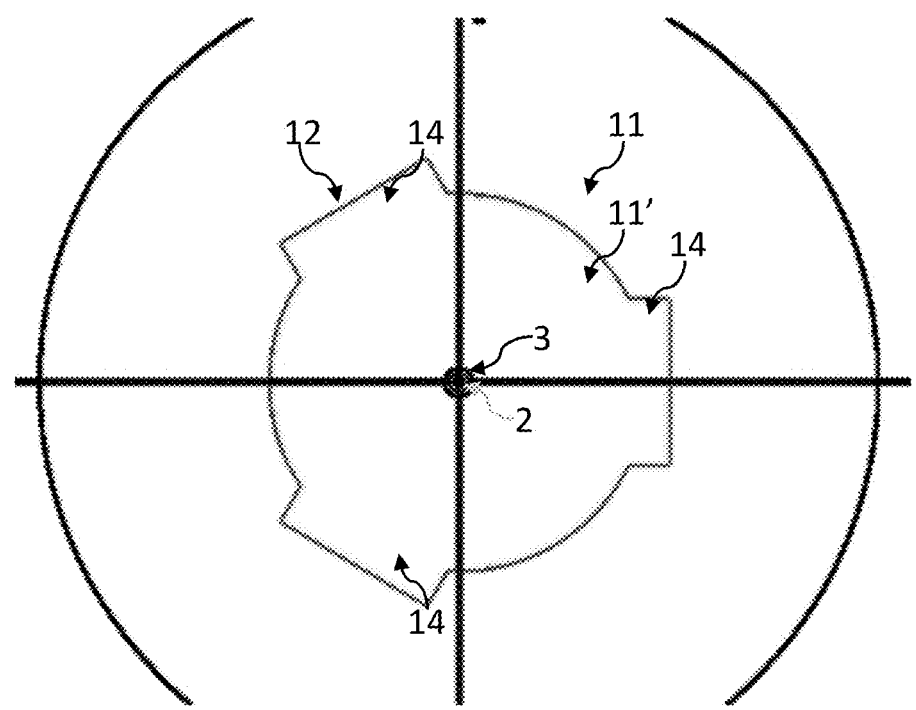

FIGS. 4A and 4B show a modeled scintillator-detector geometry, in two different sectional planes.

Figure 5A:
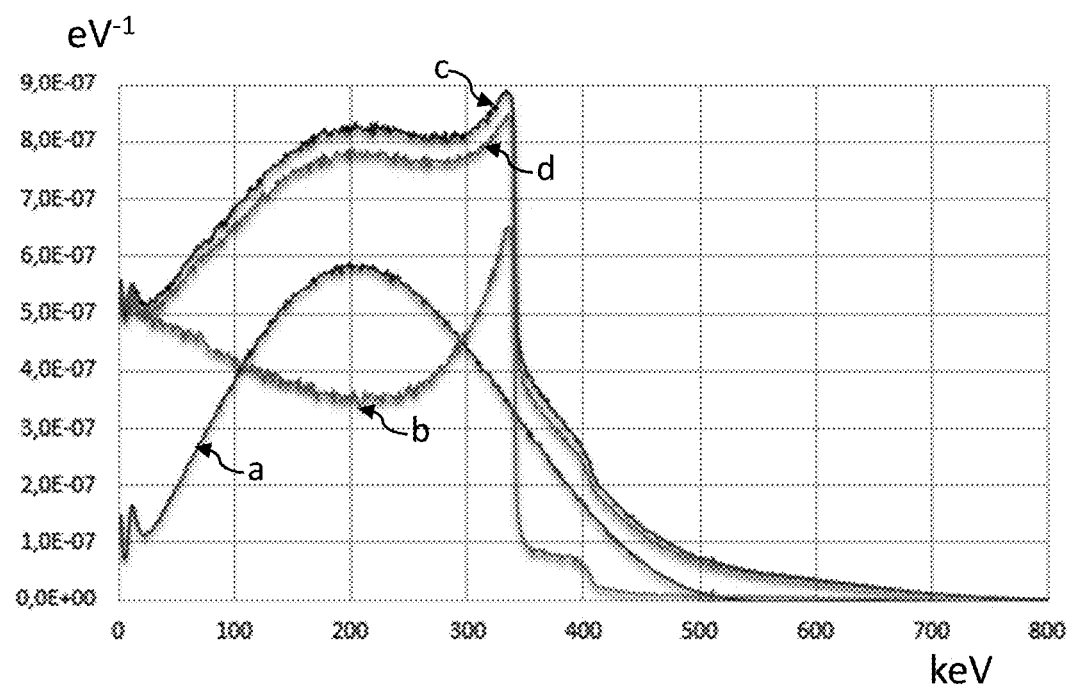
Figure 5B:
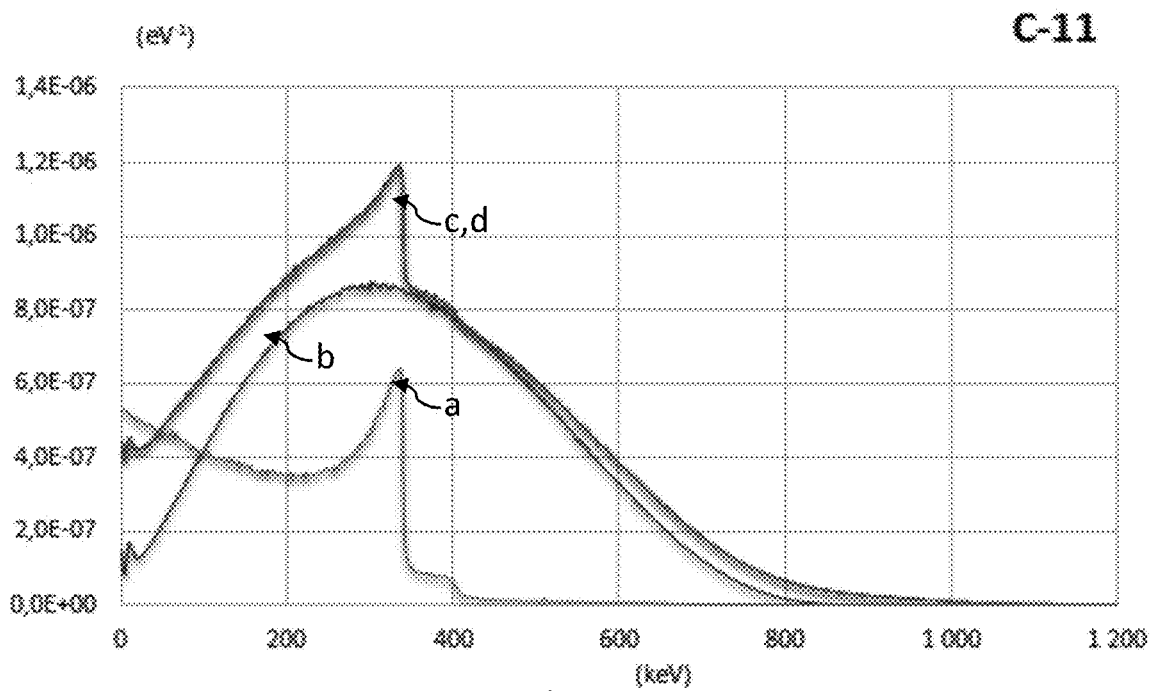

FIGS. 5A and 5B are detection spectra, representing a probability of deposition of energy by particles emitted by an activity of 1 Bq from $^{18}$F and $^{11}$C.

Figure 6A:
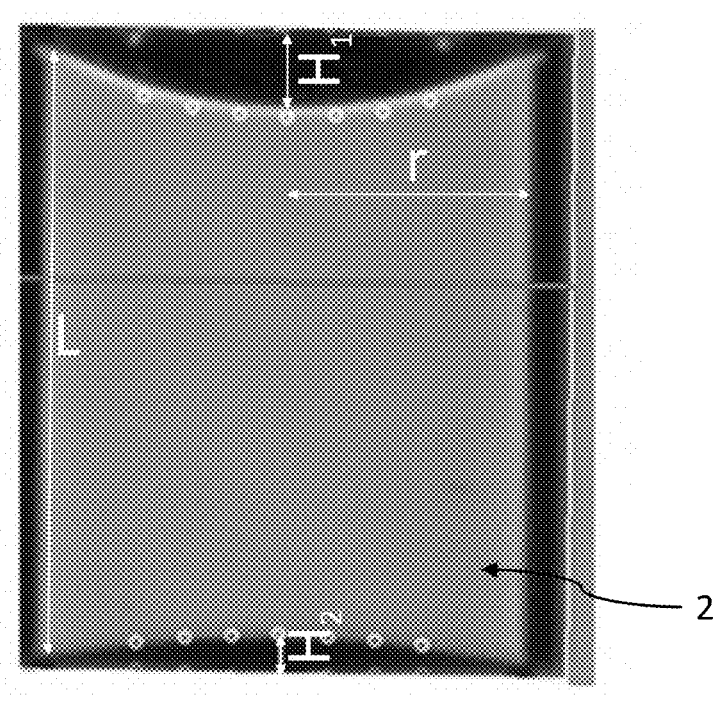

FIG. 6A shows an image of the sample, placed in the observation position.

Figure 6B:
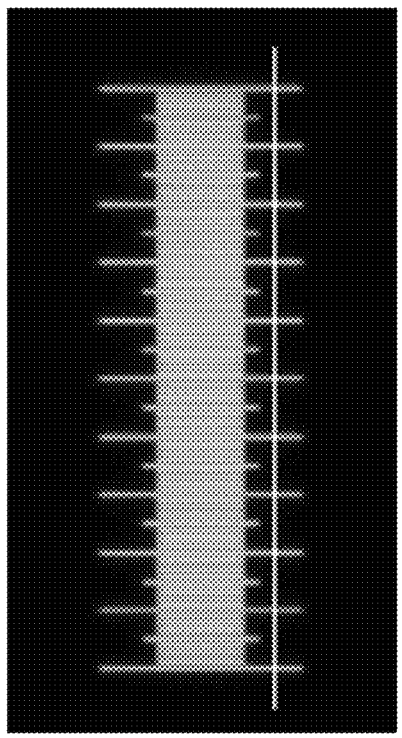

FIG. 6B shows an image of a graduated optical calibration object.

Figure 6C:
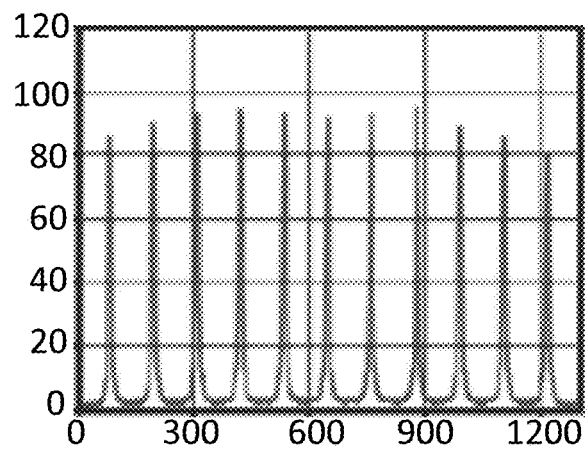

FIG. 6C shows processing of the image shown in FIG. 6B.

Figure 6D:
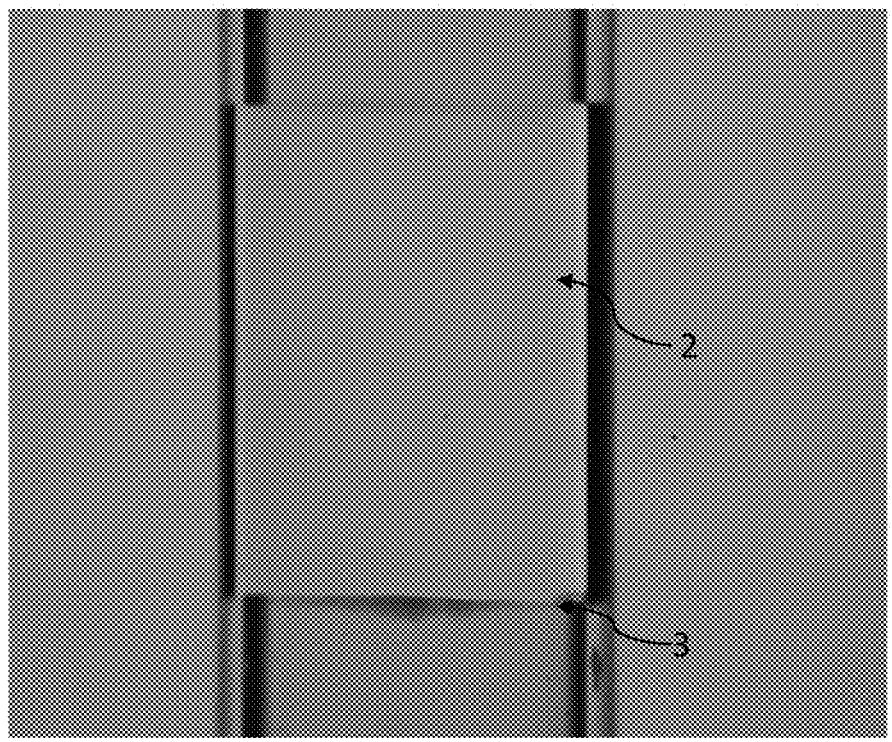

FIG. 6D shows an image of another sample, placed in the observation position.

Figure 7:
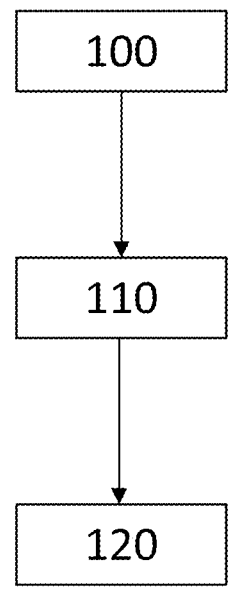

FIG. 7 schematically shows the main steps of a method implementing the device according to the invention.

DESCRIPTION OF PARTICULAR EMBODIMENTS

Figure 1A:
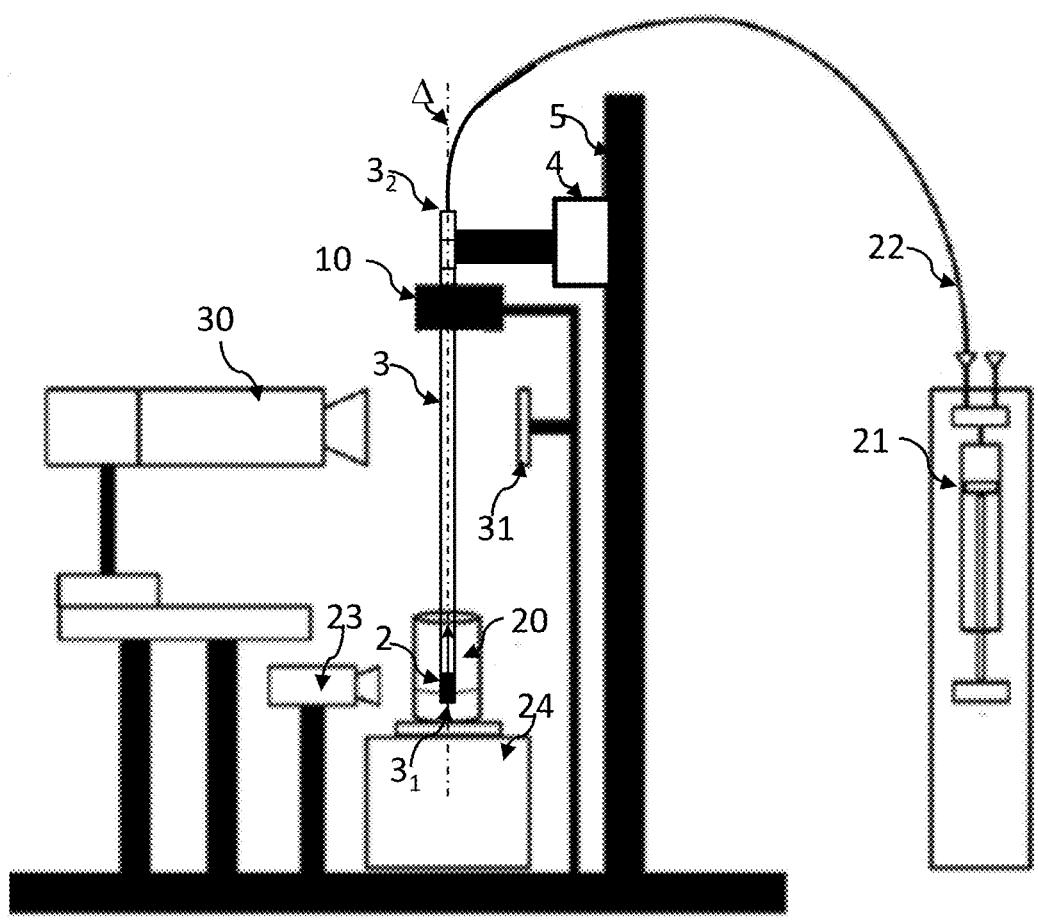
FIGS. 1A to 1C show one example of a device according to the invention.
Figure 1A:
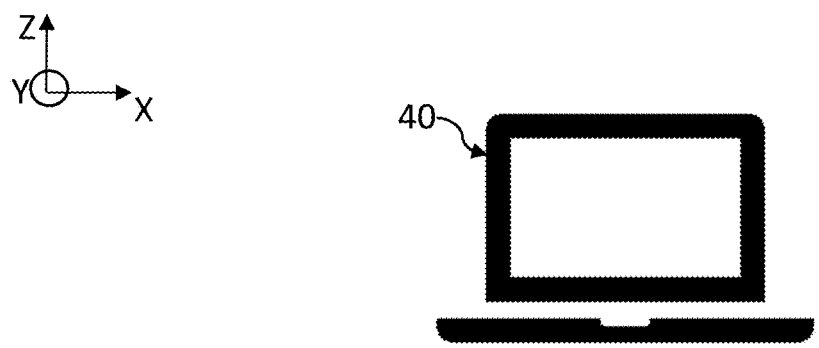
Figure 1B:
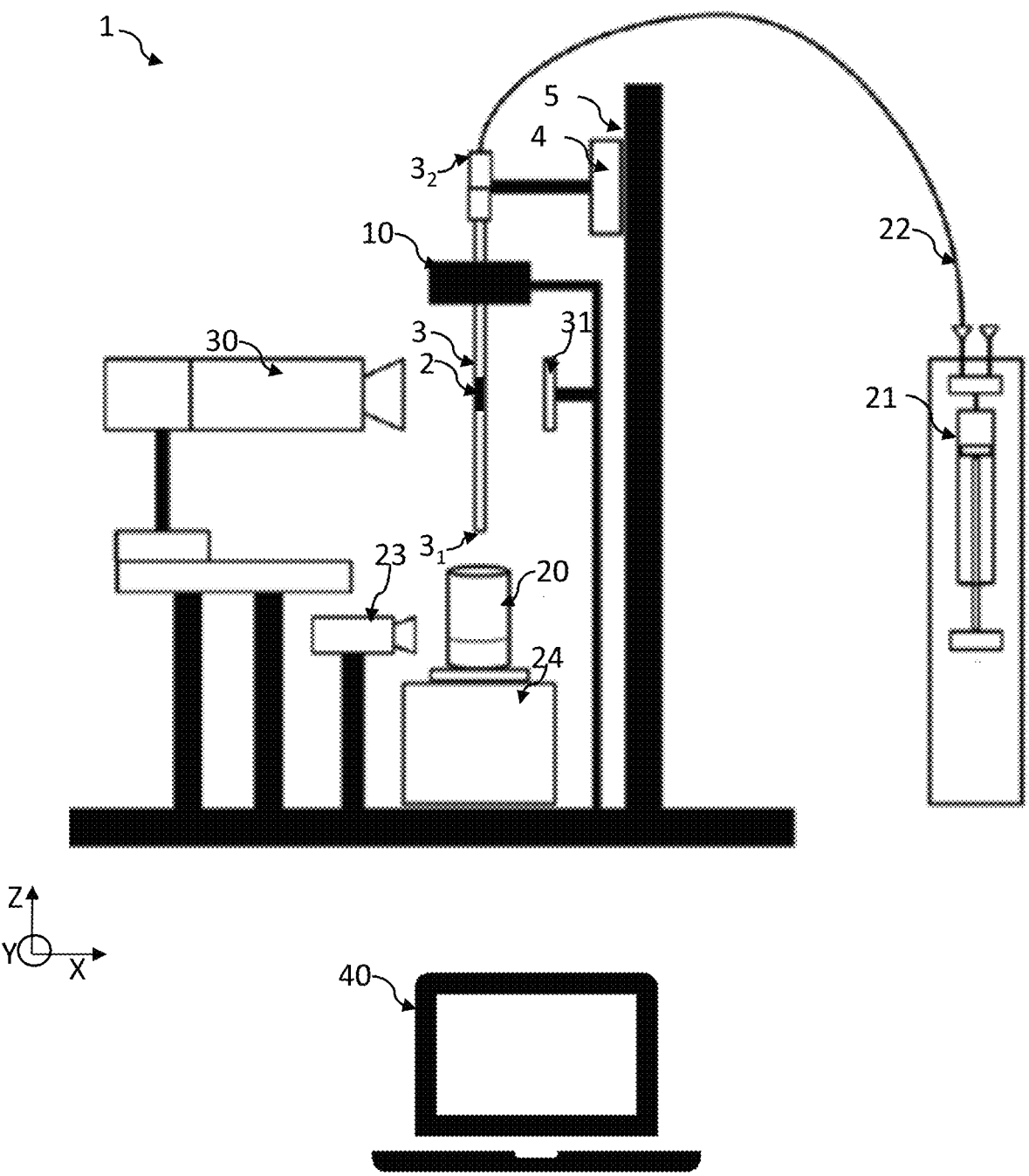
Figure 1C:
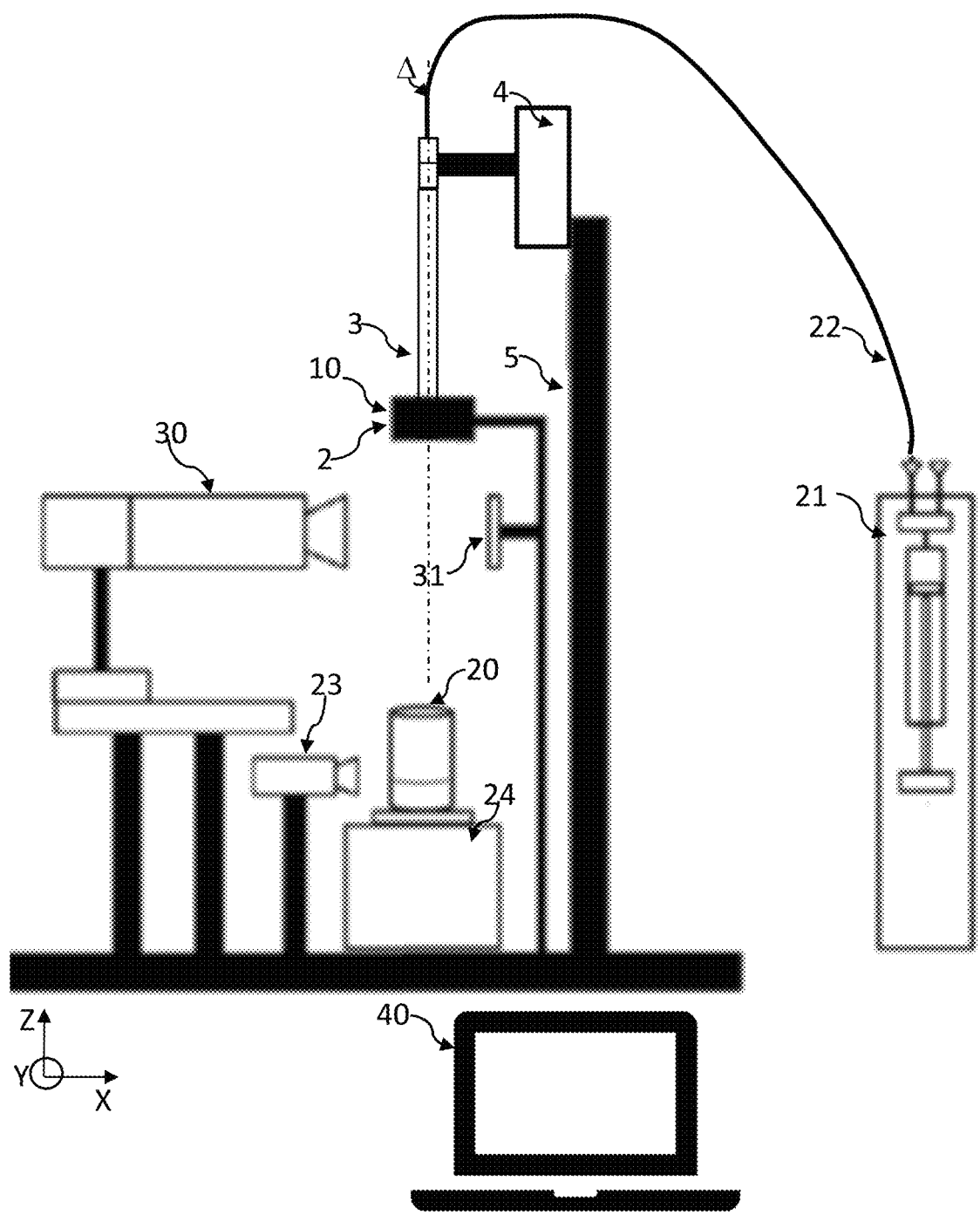

FIGS. 1A to 1C show one embodiment of a device 1 according to the invention. The objective of the device is to quantify an activity of a small volume, typically a few µL, of a radiopharmaceutical solution comprising a radioactive isotope. The radioactive isotope is known. It may notably be an isotope such as described with respect to the prior art.

Generally, the activity per unit volume or mass of a solution, intended to be injected into the body of a patient, is very high. In order to obtain an activity measurement with good accuracy, it is preferable to use a sample of small volume, so as to avoid saturation of the detector used. The inventors consider that a volume of less than 10 µL, and preferably of 1 µL or of a few µL, is optimal. The volume may also be of the order of a few 100 nL or a few 10 nL or even of the order of 1 nL. The activity per unit volume is high enough for the total activity to be easily measurable. Moreover, the fact that the total activity of the sample is high enough makes it possible to carry out measurements spaced apart in time, and to check that the decrease in activity as a function of time is consistent with the half-life of the isotope.

The radiopharmaceutical solution to be injected is contained, in liquid form, in a reservoir 20. One important element of the invention is use of a capillary tube 3, which is intended to collect the sample 2 of the pharmaceutical solution. In the example shown, the capillary tube 3 is a capillary tube made of quartz (fused silica), of 15 cm length, 900 µm inside diameter and 1200 µm outside diameter. The capillary tube 3 extends around a longitudinal axis Δ. In this example, the longitudinal axis Δ is parallel to a vertical axis Z. The horizontal plane $P_{XY}$ is defined by two orthogonal axes X and Y.

The capillary tube 3 is translatable using a translation stage 4, which is preferably motorized. In the example shown, the translation stage is configured to move along a mast 5, parallel to the longitudinal axis Δ. The translation stage allows a translation, along the longitudinal axis Δ, of the capillary tube. The capillary tube may thus occupy various positions along the longitudinal axis, as described below.

The device 1 comprises a measurement module 10, intended to quantify the activity of the sample 2 previously taken using the capillary tube 3. The translation stage 4 is thus configured to move the capillary tube between:

A sampling position, in contact with the reservoir 20, so as to take a sample 2 of radiopharmaceutical solution: the sampling position is shown in FIG. 1A. The sample 2 is thus formed by one droplet, or by a plurality of droplets, resulting from sampling.

An observation position, in which the sample 2 is placed facing an observation camera 30: the sampling position is shown in FIG. 1B.

A measurement position, in which the sample 2 is placed in the measurement module 10: the sampling position is shown in FIG. 1C.

The device is arranged so that when the capillary tube is in the sampling position, the capillary tube is engaged in the reservoir 20, so as make contact with the radiopharmaceutical solution. The reservoir 20 is removable and may not form part of the device. It may simply be a vial. The capillary tube 3 is connected, by a fluid connection, to a pumping unit 21. In this example, a first end $3_1$ of the capillary tube is dipped into the reservoir 20. The capillary tube has a second end $3_2$ opposite the first end 31. The second end $3_2$ is connected, by a steel tube 22, to the pumping unit 21. In this example, the pumping unit 21 is a syringe connected to a syringe driver. The steel tube 22 (inside diameter 2 mm) acts as a fluid connection between the capillary tube 3 and the pumping unit 21. Under the effect of actuation of the syringe driver, the pumping unit allows a negative or positive pressure to be applied to the capillary tube. This allows the radiopharmaceutical solution to be pumped or expelled through the first end $3_1$ of the capillary tube. A liquid sample 2 is thus taken. Admission of the liquid sample 2 into the capillary tube 3 has been represented in FIG. 1A by an arrow.

The device may comprise a tracking camera 23 configured to view admission of the liquid sample into the capillary tube 3. The tracking camera 23 is arranged to make it possible to view the position of the capillary tube 3 with respect to the solution present in the reservoir 20. When the first end $3_1$ has been dipped into the solution, the pumping unit 21 may be actuated. The device 1 may comprise a weighing machine 24 bearing the reservoir 20.

After the sample 2 has been taken, the capillary tube 3 is translated by the translating stage 4, so as to move it away from the reservoir 20. The pumping unit 21 may be actuated so as to move the sample 2 inside the capillary tube 3.

The capillary tube 3 is then moved, parallel to the longitudinal axis Δ, to an observation position facing an observation camera 30. The observation camera makes it possible to form an image of the capillary tube 3, so as to estimate the volume of the sample 2. The way in which the volume of the sample is calculated is described below, with reference to FIGS. 6A to 6D. A light source 31 is arranged so that, when the capillary tube is in the observation position, the sample 2 taken lies between the observation camera 30 and the light source 31. It will be understood that, in order for a usable image of the sample to be obtained, the capillary tube is transparent.

Following acquisition of the image of the sample 2 by the observation camera 30, the capillary tube 3 is translated, by the translation stage 4, to a measurement position. In the measurement position, the sample 2 is placed in the measurement module 10. The device comprises a processing unit 40, which is connected to the measurement module 10, and programmed to estimate an activity of the sample 2 based on detection signals generated by the measurement module 10.

Thus, contrary to the prior art, the capillary tube bounds an internal space, which contains the sample 2 the activity of which is measured. The capillary tube thus forms a measurement chamber.

The measurement module 10 comprises instrumentation allowing an estimation of the activity of the sample. The implementation of the measurement module assumes that the radioactive isotope contained in the sample is known.

FIGS. 2A and 2B schematically show a scintillator detector 11 the form of which is particularly suitable for the intended application. FIG. 2A is a three-dimensional view, while FIG. 2B is a cross-sectional view, of a plane perpendicular to the central axis, passing through the center of the scintillator detector. The scintillator detector 11 is formed from a solid material configured to generate scintillation photons when it is exposed to particles forming ionizing radiation. It may notably be a question of charged particles, such as $\beta^-$ or $\beta^+$, or X-ray or $\gamma$-ray photons. The scintillation material may be an organic polymer, to which fluorescent dopants have been added. It may also be a question of an inorganic scintillator, for example YaG(Ce), NaI, CsI, LaBr$_3$, or BGO (bismuth germanate). Use of an inorganic scintillator allows the sensitivity of the measurement to be increased because the stopping power of this type of scintillator is greater than the stopping power of organic scintillators. In addition, inorganic scintillators contain atoms the atomic number of which is higher than organic compounds. This promotes photoelectric interactions, during which the photons release all their energy into the scintillator material in a single interaction.

In spite of their lower sensitivity compared with inorganic scintillators, an important advantage of organic scintillator materials is the ease with which they may be shaped, the latter being able to be carried out by molding. FIGS. 2A to 2D show various configurations of an organic scintillator detector based on vinyl toluene, able to be obtained by molding.

The scintillator detector 11 is optically coupled to a plurality of photodetectors 15. The latter may notably be photomultipliers, for example of the Hamamatsu H13175U-110 type. Preferably, the scintillator detector 11 comprises or is optically coupled to planar faces 12, each photodetector 15 being applied against one planar face 12, optionally using a coupling fluid. According to one possibility, at least one photodetector, or even each photodetector, is or comprises a photodiode. It may for example be a question of an SiPM photodetector (SiPM standing for Silicon PhotoMultiplier).

One important aspect of the scintillator detector is that an aperture 13 extending about a central axis $\Delta'$ passes through it. During use of the scintillator detector in the device 1, the central axis $\Delta'$ coincides with the longitudinal axis $\Delta$. The aperture 13 is dimensioned to allow a translation of the capillary tube 3 through the scintillator detector 11. For example, when the outside diameter of the capillary tube 3 is 1.2 mm, the diameter of the aperture 13 may be equal to 1.4 mm. Generally, the diameter of the aperture is preferably between 1 mm and 1 cm.

The scintillator detector may have a parallelepipedal shape, with four planar faces parallel to the central axis $\Delta'$. Such a possibility is schematically shown in FIG. 3A. It may also have a polyhedral shape, with planar faces parallel to the central axis $\Delta'$.

Preferably, the scintillator detector has rotational symmetry about the central axis $\Delta'$. In the example shown in FIGS. 2A and 2B, the scintillator detector comprises a central segment 11', of spherical shape, extending around the aperture 13. The spherical segment 11' is arranged around the aperture 13, and preferably symmetrically about the central axis $\Delta'$. The fact that the scintillator material has a spherical segment, around the aperture 13, is considered advantageous for reasons of symmetry, in particular during the processing of detection signals described below.

According to one possibility, the scintillator detector 11 may comprise a cylindrical central segment extending around the central axis $\Delta'$. Such a possibility is shown in FIG. 3B. The wall of the capillary tube may be formed from a scintillator material.

When the central segment 11' is a sphere or a cylinder, its radius may be between 15 mm and 25 mm when the scintillator material is an organic scintillator. The radius is for example equal to 18 mm. The optimum dimensions vary depending on the type of scintillator material used. It is considered that it is optimal for the central segment 11' to be spherical.

In order to facilitate coupling with the photodetectors 15, the scintillator detector 11 comprises faces 12 that are planar, and preferably parallel to the central axis $\Delta'$. In FIGS. 2A and 2B, the scintillator is in one piece. It comprises cylindrical coupling segments 14, each coupling segment 14 extending between the central segment 11' and one planar face 12. Each planar face 12 extends perpendicular to a detection axis, which is secant, and preferably perpendicular, to the central axis $\Delta'$. FIG. 2B shows three different detection axes $\delta_1$, $\delta_2$ and $\delta_3$, perpendicular to which three different planar faces 12 extend. Preferably, the detection axes are distributed symmetrically about the central axis $\Delta'$. Preferably, the detection axes are coplanar. The plane in which the detection axes lie is preferably perpendicular to the central axis $\Delta'$. In the example of FIG. 2B, adjacent detection axes are angularly offset by the same angle $\theta$ equal to 120°. According to other possibilities, the scintillator comprises two planar faces perpendicular to one detection axis, this corresponding to an angular offset of 180°. According to another possibility, the scintillator comprises four planar faces, such that the detection axes of two adjacent planar faces are angularly offset by 90°. More generally, the scintillator 11 may comprise n planar faces 12, arranged so that the respective detection axes of two adjacent planar faces are offset by an angle $\theta$ equal to 360°/n.

In the example of FIGS. 2A and 2B, the scintillator 11 is in one piece: the central segment 11' and each coupling segment 14 are formed from the same scintillator material. Such a configuration may be obtained by molding when the scintillator material is organic. In the example of FIG. 2C, the central segment 11' is formed from a scintillator material, while each coupling segment 14 is formed by a material that is transparent to the scintillation photons. Each coupling segment 14 is attached to the central segment 11'. FIG. 2C is a view of a cross-sectional plane passing through each detection axis.

FIG. 2D is also a view of a cross-sectional plane passing through each detection axis. In FIG. 2D, the central segment 11' is truncated, so as to form the planar faces 12. In this configuration, there is no coupling segment 14.

The measurement module 10 may comprise a spectrometric detector 17. FIG. 2B shows a spectrometric detector 17 placed facing the scintillator detector 11. The spectrometric detector is configured to detect X-ray or gamma-ray photons emanating from the scintillator 11. It is connected to a spectrometry circuit 17', which is configured to form an energy spectrum. More precisely, each time a photon is detected by the spectrometric detector, the latter generates a pulse the amplitude of which is correlated with the energy deposited by the photon in the spectrometric detector. The spectrometry circuit 17' allows a spectrum to be formed, which corresponds to a histogram of the amplitudes of the pulses resulting from the spectrometric detector 17. The spectrum corresponds to a number of pulses detected, during an acquisition period, for various energy channels.

The spectrometry circuit is connected to the processing unit 40. More precisely, the processing unit implements a spectral-analysis algorithm, allowing certain singularities to be identified. It may be a question of radioactive impurities. It may be a question of peaks resulting from the X-ray fluorescence of certain materials, in particular metals, for example Fe, In or Pd. Metals resulting from the process used to produce the radioactive isotope form impurities in the radiopharmaceutical solution. The excitation inducing the X-ray fluorescence may be due to X-rays or gamma-rays emitted directly or indirectly by the isotopes. For example, when the isotope is a $\beta^+$ emitter, the fluorescence may be induced by irradiation of the sample with photons resulting from annihilation of the $\beta^+$ particle.

The spectrometric detector may use a detection material such as $CeBr_3$ or NaI(Tl) or CsI or CdTe. This type of material allows a spectrum of acceptable quality to be formed using a spectrometric detector that is compact enough to be integrated into the detection module 10. The spectrometric detector may be of GeHP type, provided that adequate cooling means, for example a cryogenic tank or thermoelectric cooling, is provided.

Figure 1D:
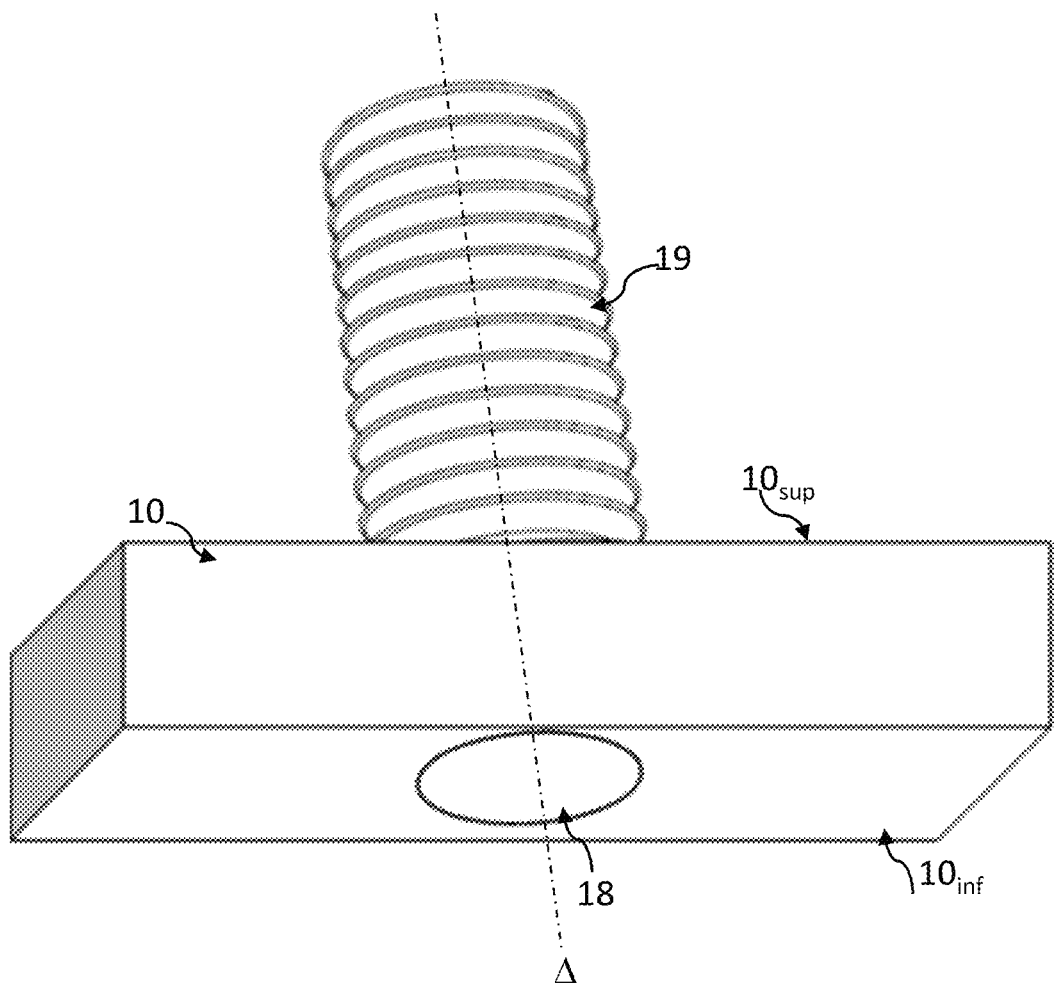
FIG. 1D shows a shutter and a bellows intended to ensure a seal-tightness of the measurement module with respect to ambient light.

The detection module 10 extends, along the longitudinal axis $\Delta$, between a lower face $10_{inf}$ and an upper face $10_{sup}$. On account of the presence of the photodetectors 15, which may be sensitive to visible light, the detection module 10 is sealed through use of a shutter 18, on the lower face $10_{inf}$ facing the container 20, and of an opaque bellows 19, which extends around the capillary tube, from the upper face $10_{sup}$. FIG. 1D schematically shows the arrangement of the shutter 18 and bellows 19 on the detection module. When the capillary tube 3 is in the measurement position, the shutter is closed. Opening the shutter allows the capillary tube to be translated so that the sample 2 is outside the measurement module, for example in the observation position or in the sampling position. The opaque bellows is configured to fold or retract depending on the translation of the capillary tube 3.

The inventors have established a digital model in order to simulate the detection performance of a scintillator detector such as described with reference to FIGS. 2A and 2B. FIG. 4A shows a cross-sectional view of the digital model, in an XZ plane, passing through the central axis. FIG. 4B shows a cross-sectional view of the digital model, in an XY plane, perpendicular to the central axis, and passing through the center of the spherical segment 11'.

Such a digital model is intended to estimate the energy absorbed by the scintillator detector when the latter is subjected to exposure to radiation produced by a predetermined isotope. FIG. 5A shows, for $^{18}F$ $\beta^+$ decay, a density of the probability of release, in the scintillator detector, of various energy values. The x-axis corresponds to energy, expressed in keV. The y-axis represents, for each decay, the probability of the energy corresponding to the x-axis being deposited in the scintillator detector. In FIG. 5A, curve a) corresponds to the energy deposited by a positron emitted by $^{18}F$, with annihilation not taken into account. Curve b) corresponds to the energy deposited by the two gamma photons of 511 keV energy resulting from annihilation of the positron. Curve c) corresponds to a probability of energy deposition as a result of a combination of passage of the positron through the scintillator detector and annihilation, giving rise to emission of 511 keV photons. Curve d) corresponds to curve c) but with a branching ratio of 97% taken into account for the $^{18}F$ $\beta^+$ decay.

FIG. 5B is a figure similar to FIG. 5A, established for $^{11}C$ $\beta^+$ decay, the branching fraction being 99%.

In FIGS. 5A and 5B, low-energy emissions due to electron capture do not pass through the sample 2 or the capillary tube 3. They release no energy into the scintillator detector 11.

In FIGS. 5A and 5B, the sample is a droplet of physiological liquid containing $^{18}F$ and $^{11}C$ with a unit activity of 1 Bq, respectively.

The curves d) of FIGS. 5A and 5B correspond to absorption spectra of the scintillator detector, for $^{18}F$ and $^{11}C$ of 1 Bq activity, respectively. These absorption spectra may be used as input data to determine the activity of a sample 2, as described below.

When the device 1 is implemented, the processing unit 40 is connected to each photodetector 15 and collects a detection signal generated by each thereof. More precisely, each photodetector is connected to a coincidence detection circuit 16, which is intended to determine the pulses detected in temporal coincidence by two photodetectors (double coincidences) and by the three photodetectors (triple coincidences). As described in the publication Broda R. et al "Radionuclide metrology using liquid scintillation counting", Metrologia 44 (2007), when a sample of unknown activity considered to be a pure $\beta$ emitter is used, it may be shown that a detection efficiency $\eta$, called the absolute detection efficiency, may be determined based on a ratio of the number of triple coincidences to the number of double coincidences.

More precisely, if $N_T$ corresponds to the number of triple coincidences and $N_D$ corresponds to the number of double coincidences, the ratio $$\frac{N_T}{N_D},$$

designated RCTD (ratio of triple to double coincidences), is such that:

$$RCTD = \frac{\int_0^{E_{max}} S(E)(1 - e^{-\eta})^2 dE}{\int_0^{E_{max}} S(E)\bigl(3(1 - e^{-\eta})^2 - 2(1 - e^{-\eta})^2\bigr)dE} \quad (1)$$

$$\text{where } \eta = \frac{v}{3} \int_0^{E_{max}} \frac{\eta_0}{1 + kB\frac{dE}{dx}} dE \quad (2)$$

where:
- S(E) is the absorption spectrum of the isotope in question, which corresponds to curve d) of FIG. 5A (for $^{18}F$) and FIG. 5B (for $^{11}C$);
- v is the quantum efficiency of the photomultipliers, which is unknown;
- $\eta_0$ is a luminous efficiency of the scintillator material, which corresponds to a number of scintillation photons emitted per unit of absorbed energy (photons·keV$^{-1}$);

$$\frac{dE}{dx}$$

is the energy loss per unit path length of an incident ($\beta^+$ or $\beta^-$) particle in the scintillator detector;
- $E_{max}$ is the maximum energy of the emission spectrum of the incident particle;
- kB is a semi-empirical parameter, usually designated Birks' coefficient, expressed in cm·MeV$^{-1}$. This parameter describes the non-linearity of the scintillator. It is usually between 0.007 and 0.015 cm·MeV$^{-1}$.

The parameters S(E), $$\frac{dE}{dx},$$

and kB are input data. RCTD is a measured datum, resulting from the coincidence detection circuit 16. The product $v\eta_0$ (product of multiplication of the quantum efficiency of the photomultipliers by the luminous efficiency of the scintillator material) may be determined so as to obtain the absolute detection efficiency $\eta$. The calculated efficiency $\eta$ is the one that allows equality (1) to be satisfied.

The calculated efficiency $\eta$ is used to determine a double-coincidence detection efficiency $\varepsilon_D$, according to the expression:

$$\varepsilon_D = \left(3(1-e^{-\eta})^2 - 2(1-e^{-\eta})^2\right) \qquad (3)$$

The activity Act of the isotope is then determined, from $N_D$, with:

$$Act = \frac{N_D}{\varepsilon_D} \qquad (4)$$

$N_D$ corresponds to a so-called logical sum of the double coincidences detected per unit time. For example, if there are three photodetectors $15_1$, $15_2$ and $15_3$, $N_D$ is such that:

$$N_D = N_{1,2} + N_{1,3} + N_{2,3} - 2N_{1,2,3} \qquad (5)$$

where $N_{1,2}$, $N_{1,3}$ and $N_{2,3}$ are the number of double coincidences detected, per unit time, by photodetectors $15_1$ and $15_2$, $15_1$ and $15_3$, $15_2$ and $15_3$, respectively. $N_{1,2,3}$ corresponds to the number of triple coincidences detected per unit time: $N_{1,2,3}=N_T$ (6). The processing unit 40 receives the quantities $N_{1,2}$, $N_{1,3}$ and $N_{2,3}$ and $N_T$ from the coincidence circuit 16. It may then determine $\eta$ by implementing expression (1). This makes it possible to obtain $\varepsilon_D$, by implementing (3), based on $\eta$, and then the activity Act via expression (4).

Preferably, the efficiency $\eta$ is determined, on each measurement, by a ratio of the number of triple coincidences to the number of double coincidences. The double-coincidence detection efficiency $\varepsilon_D$ may thus be determined, according to (3), on each measurement. The need for laboratory calibration is avoided, this being a notable advantage of the invention.

The activity Act of the sample 2 may be estimated at various successive measurement times t, so as to obtain values Act(t). The variation in Act(t) as a function of time may be compared with a theoretical variation, established based on the half-life of the isotope in question. A deviation between the measured variation and the theoretical variation may be indicative of the presence of contamination in the sample 2.

The activity Act(t) of the sample 2, measured at measurement time t, is preferably normalized by the volume of the sample. This makes it possible to estimate the activity per unit volume or mass of the radiopharmaceutical solution present in the container 20.

The volume of the sample may be estimated using an image acquired by the observation camera 30, while the sample 2 occupies the observation position. On account of the geometry of the capillary tube, without any particular processing, the sample extends between two menisci, as shown in FIG. 6A. The processing unit 40 receives the image acquired by the observation camera, and is able to estimate a volume V of the sample, for example by applying the expression:

$$V = \pi L r^2 - \frac{1}{6}\pi H_1 (3r^2 + H_1^2) - \frac{1}{6}\pi H_2 (3r^2 + H_2^2) \qquad (7)$$

where:
L is the total length of the sample;
r is the inside radius of the capillary tube;
$H_1$ is a height of the first meniscus;
$H_2$ is a height of the second meniscus.

The quantities L, r, $H_1$ and $H_2$ are estimated from the image. The observation camera will have been calibrated beforehand, for example through acquisition of an image of a test pattern or a graduated ruler. FIG. 6B shows an image of an Olympus OB-M object micrometer. FIG. 6C shows an intensity profile of an acquired image, each peak corresponding to one graduation. In FIG. 6C, the y-axis corresponds to an intensity and the x-axis corresponds to pixels aligned along the light line shown in FIG. 6B. Since the distance between each graduation is known, it is possible to estimate a dimension seen by each pixel of the observation camera. It is estimated that the performance of the observation camera allows a volume of 1 µL to be estimated with an uncertainty of less than 1%.

According to one possibility, the inner wall of the capillary tube is hydrophobic, or has been subjected to a hydrophobic treatment. Such a treatment allows the presence of menisci on either side of the sample to be reduced or even eliminated. FIG. 6D is an image of a sample 2 in a capillary tube the internal face of which received a hydrophobic treatment beforehand. It will be understood that estimation of the volume of the sample, based on the observation image, is simpler, because the geometry of the sample corresponds to a cylinder.

After the activity of the sample has been determined, the capillary tube is translated toward the sampling position and the sample may be expelled into the reservoir 20 by applying a positive pressure to the capillary tube.

According to one possibility, the capillary tube 3 may be made directly from an inorganic scintillator material that has mechanical characteristics and a surface finish similar to those of glass or quartz.

The same surface treatment as used for glass may be applied to make it hydrophobic and avoid surface contamination.

Such a capillary tube makes it possible not only to sample a liquid, but also to take an image with a view to measurement of volume and to detect the radiation emitted by the liquid.

Any non-hygroscopic inorganic scintillator may be used, such as YAG(Ce) (cerium-doped yttrium aluminum garnet), YAP(Ce) (cerium-doped yttrium aluminum perovskite), GaGG(Ce) (cerium-doped gadolinium aluminum gallium garnet), etc.

Just as in the embodiments described above, the capillary tube may be inserted into the scintillator detector 11.

The scintillator detector 11, into which the capillary tube 3 is inserted, is preferably of the same composition as the capillary tube.

FIG. 7 shows the main steps of a method for implementing a device such as described above.

In a step 100, the capillary tube is moved into the sampling position and a sample 2 is taken under the effect of the pumping unit.

In a step 110, the capillary tube is placed in the observation position and an image of the sample is acquired by the observation camera, this allowing the volume (or mass) of the sample to be estimated.

In a step 120, the capillary tube is placed in the measurement position, in the measurement module 10. The activity of the sample is estimated based on the detection signals resulting from each photodetector, and on the number of double coincidences detected. Step 120 may be implemented before step 110.

The inventors have used a device such as described above, the scintillator detector being like that described with reference to FIGS. 2A and 2B. After each measurement, each sample was ejected into a liquid scintillation solution, so as to obtain a reference measurement. The isotope was $^{18}$F or $^{11}$C. Table 1 summarizes the experimental results obtained.

TABLE 1

| Trial reference | Isotope | Activity per unit volume (Bq/mL) | Activity per unit volume - reference method (Bq/mL) | Deviation (%) |
|---|---|---|---|---|
| 1 | $^{18}$F | $7.93 \times 10^7$ | $8.23 \times 10^7$ | 3.7% |
| 2 | $^{18}$F | $7.52 \times 10^7$ | $7.52 \times 10^7$ | 0.01% |
| 3 | $^{11}$C | $9.54 \times 10^6$ | $9.47 \times 10^6$ | 0.61% |

In table 1, the third and fourth columns correspond to the activity per unit volume determined by implementing the invention and the reference method, respectively. In trial 1, a capillary tube without hydrophobic treatment was used. In trial 2, the capillary tube received a hydrophobic treatment, this possibly explaining the smaller deviation between implementation of the invention and the reference method.

The device according to the invention makes it possible to estimate the activity of a radioactive liquid without requiring complex calibration, involving a reference laboratory. Specifically, the measurement is performed on a sample of small volume, taken from a radiopharmaceutical solution. Activity is estimated on the basis of measurements of double coincidences, as described above, the detection efficiency being able to be calculated through a ratio of triple coincidences to double coincidences.

The device according to the invention is easily automatable, this making it possible to limit the intervention by operators in proximity to the radioactive liquid. Specifically, translation of the capillary tube, control of the pumping unit and control of the measurement module may be automated. This helps to decrease the dose absorbed by the intervening personnel.

The invention claimed is:

1. A device configured to measure an activity of a radioactive liquid, the device comprising:
    a detector, which extends around a measurement chamber that is configured to contain the radioactive liquid, the detector being configured to detect ionizing radiation emitted from the measurement chamber and to generate a detection signal dependent on an amount of the detected ionizing radiation; and
    processing circuitry, connected to the detector, and programmed to estimate an activity of the radioactive liquid based on the detection signal, wherein:
    the detector comprises:
        a solid-state scintillator detector configured to produce scintillation photons when exposed to ionizing radiation, the solid-state scintillator detector extending around the measurement chamber; and
        at least two photodetectors that are optically coupled to the solid-state scintillator detector, each photodetector of the at least two photodetectors being configured to detect scintillation photons and to generate a detection signal dependent on an amount of scintillation photons detected; and
    the device further comprises a capillary tube, which extends around a longitudinal axis, and which defines an internal space configured to contain the radioactive liquid, the capillary tube being configured to be placed in a measurement position in which the solid-state scintillator detector extends around the internal space of the capillary tube, the capillary tube forming the measurement chamber.

2. The device as claimed in claim 1, wherein the solid-state scintillator detector extends around the capillary tube.

3. The device as claimed in claim 1, wherein the solid-state scintillator detector forms a wall of the capillary tube.

4. The device as claimed in claim 1, wherein:
    the solid-state scintillator detector forms an aperture along the longitudinal axis; and
    the capillary tube extends through the aperture when the capillary tube is placed in the measurement position.

5. The device as claimed in claim 4, wherein the solid-state scintillator detector comprises a central segment, through which the aperture passes, the central segment being spherical, cylindrical, or polyhedral.

6. The device as claimed in claim 5, wherein each photodetector, of the at least two photodetectors, is optically coupled to the solid-state scintillator detector by a planar face; and
    the solid-state scintillator detector extends, from the aperture, to at least one planar face, so that the solid-state scintillator detector comprises the central segment, around the aperture, and at least one planar face.

7. The device as claimed in claim 6, wherein the solid-state scintillator detector comprises as many planar faces as there are photodetectors in the at least two photodetectors.

8. The device as claimed in claim 1, wherein each photodetector, of the at least two photodetectors, extends around a detection axis being secant to the longitudinal axis.

9. The device as claimed in claim 8, wherein respective detection axes of each photodetector, of the at least two photodetectors, are coplanar.

10. The device as claimed in claim 8, wherein respective detection axes of each photodetector, of the at least two photodetectors, are regularly spaced angularly with respect to one another about the longitudinal axis.

11. The device as claimed in claim 1, wherein each photodetector, of the at least two photodetectors, is optically coupled to the solid-state scintillator detector by a planar face.

12. The device as claimed in claim 11, further comprising a coupling segment formed by a material that is transparent to the scintillation photons, extending between the solid-state scintillator detector and at least one planar face.

13. The device as claimed in claim 1, further comprising a spectrometric detector, which lies facing the capillary tube, and which is connected to the processing circuitry, the processing circuitry being configured to detect a presence of impurities in the radioactive liquid, based on X-ray fluorescence peaks in a spectrum generated by the spectrometric detector.

14. The device as claimed in claim 1, further comprising a motorized translating unit including a motor and configured to move the capillary tube translationally along the longitudinal axis, so that the capillary tube may pass between the measurement position, facing the solid-state scintillator detector, and at least one sampling position, the at least one sampling position being offset, along the longitudinal axis, with respect to the measurement position.

15. The device as claimed in claim 14, further comprising a pumping unit configured to:
  admit, in the at least one sampling position, the radioactive liquid into the internal space of the capillary tube when the capillary tube is in contact with a solution contained in a reservoir, the radioactive liquid contained in the capillary tube forming a sample of the solution; and/or
  expel the radioactive liquid from the internal space of the capillary tube.

16. The device as claimed in claim 1, wherein the capillary tube has an internal face bounding the internal space, the internal face being hydrophobic.

17. The device as claimed in claim 1, wherein;
  the detection signal resulting from each photodetector, of the at least two photodetectors, comprises pulses, each pulse resulting from an interaction of one particle, forming the ionizing radiation, in the solid-state scintillator detector;
  the processing circuitry is configured to detect pulses detected in a temporal coincidence by the at least two photodetectors; and
  the processing circuitry is further programmed to estimate an activity depending on a number of pulses detected in a temporal coincidence.

18. The device as claimed in claim 1, further comprising an observation camera arranged to view the capillary tube when the capillary tube is in an observation position, the observation position being offset from the measurement position, the processing circuitry being further programmed to estimate a volume of the radioactive liquid in the capillary tube depending on an image delivered by the observation camera.

19. A method for estimating an activity of the radioactive liquid using a device as claimed in claim 1, comprising:
  (a) introducing a liquid sample into the capillary tube;
  (b) placing the capillary tube in the measurement position;
  (c) acquiring detection signals with each photodetector; and
  (d) depending on the acquired detection signals, estimating the activity of the liquid sample present in the capillary tube, using the processing circuitry.

20. The method as claimed in claim 19, wherein:
  in step (a), the capillary tube occupies a sampling position, in contact with a reservoir containing the radioactive liquid; and
  between step (a) and step (b), the capillary tube is moved by a translating unit that includes a motor from the sampling position to the measurement position.

21. The method as claimed in claim 20, wherein in step (a), a pump is activated so as to suck some of the radioactive liquid present in the reservoir toward the capillary tube.

22. The method as claimed in claim 19, wherein step (d) further comprises:
  detecting, in the detection signals, double coincidence pulses generated in a temporal coincidence by two photodetectors of the at least two photodetectors;
  taking into account a detection efficiency relating to double coincidences; and
  determining the activity of the radioactive liquid based on a number of the double coincidences detected per unit time and the detection efficiency relating to the double coincidences.

23. The method as claimed in claim 22, wherein
  the at least two photodetectors comprise three photodetectors; and
  the detection efficiency relating to double coincidences is calculated based on a ratio between a number of pulses generated, in the detection signals, in a temporal coincidence by the three photodetectors and the number of double coincidences detected per unit time.

* * * * *